(12) United States Patent
Schreiner et al.

(10) Patent No.: US 6,909,097 B2
(45) Date of Patent: Jun. 21, 2005

(54) SCINTILLATION DETECTOR, SYSTEM AND METHOD PROVIDING ENERGY AND POSITION INFORMATION

(75) Inventors: Robert S. Schreiner, Chagrin Falls, OH (US); John A. White, Chagrin Falls, OH (US); Michael R. Mayhugh, Shaker Heights, OH (US); George Mataraza, Euclid, OH (US); Csaba M. Rozsa, Chagrin Falls, OH (US); Daniel J. Herr, Twinsburg, OH (US)

(73) Assignee: Saint Gobain Ceramics and Plastics, Inc., Worcester, MA (US)

( * ) Notice: Subject to any disclaimer, the term of this patent is extended or adjusted under 35 U.S.C. 154(b) by 86 days.

(21) Appl. No.: 10/115,596

(22) Filed: Apr. 3, 2002

(65) Prior Publication Data

US 2003/0034455 A1 Feb. 20, 2003

Related U.S. Application Data

(60) Provisional application No. 60/281,284, filed on Apr. 3, 2001.

(51) Int. Cl.[7] .............................................. G01T 1/202
(52) U.S. Cl. ...................................... 250/366; 250/367
(58) Field of Search ................................. 250/366, 367, 250/368, 369, 370.09, 370.11, 370.15, 363.02, 363.07, 363.1

(56) References Cited

U.S. PATENT DOCUMENTS

| | | | | |
|---|---|---|---|---|
| 4,415,808 A | * | 11/1983 | Cusano et al. ............... 250/367 |
| 4,434,369 A | | 2/1984 | Metal | |
| 4,531,058 A | * | 7/1985 | Burnham et al. ....... 250/363.03 |
| 4,749,863 A | * | 6/1988 | Casey et al. ............ 250/363.03 |
| 4,750,972 A | * | 6/1988 | Casey et al. .................... 216/24 |
| 5,378,894 A | * | 1/1995 | Akai ........................... 250/368 |
| 5,442,179 A | * | 8/1995 | Ohishi ..................... 250/363.02 |
| 5,519,224 A | * | 5/1996 | Mattern ....................... 250/369 |
| 5,576,547 A | | 11/1996 | Ferreira et al. | |
| 5,652,429 A | * | 7/1997 | Genna ......................... 250/368 |
| 5,773,829 A | * | 6/1998 | Iwanczyk et al. ............ 250/367 |
| 6,271,525 B1 | * | 8/2001 | Majewski et al. ............ 250/367 |
| 6,362,479 B1 | * | 3/2002 | Andreaco et al. ............ 250/366 |
| 6,552,348 B2 | * | 4/2003 | Cherry et al. ........... 250/363.03 |

OTHER PUBLICATIONS

Heiderich, M. et al. "A two–dimensional scintillation detector for small angle neutron scattering." *Nuclear Instruments & Methods in Physics Research, Section A: Accelerators, Spectrometer, Detectors and Associated Equipment.* Amsterdam, NL, Jul. 20, 1991. vol. A305, No. 2, pp. 423–432.

* cited by examiner

*Primary Examiner*—Otilia Gabor
(74) *Attorney, Agent, or Firm*—Renner, Otto, Boisselle & Sklar, LLP

(57) ABSTRACT

A radiation detector, in particular a gamma camera, is constructed and operated in such a fashion that only a predetermined number of light sensors (such as PMT's) adjoining each other in a cluster are used to generate a signal with amplitude and event position information. The camera may also use an array of individual scintillation elements (crystals) in place of a single crystal, with certain advantages obtained thereby. According to another aspect of the invention, there is a reflector sheet that defines an array of apertures through which scintillation light can pass from the scintillation crystal to a plurality of light sensors optically coupled to an optical window in an array corresponding to the array of apertures in the reflector.

37 Claims, 4 Drawing Sheets

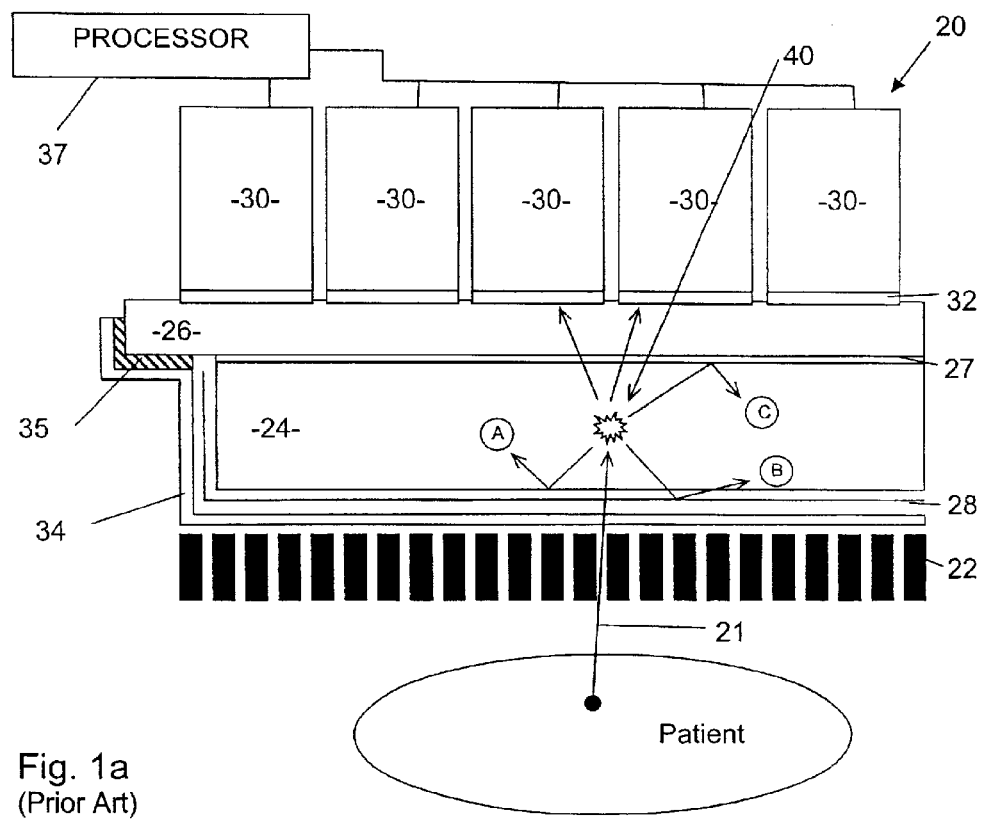
Fig. 1a
(Prior Art)
Fig. 2a
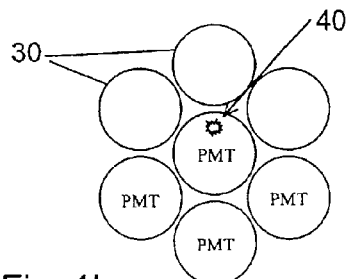
Fig. 1b
(Prior Art)
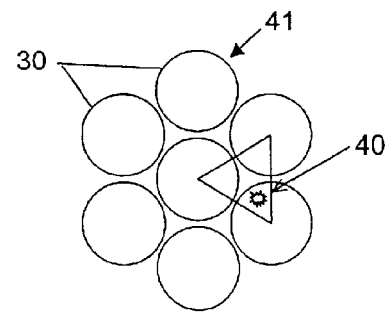

SCINTILLATION DETECTOR, SYSTEM AND METHOD PROVIDING ENERGY AND POSITION INFORMATION

RELATED APPLICATION DATA

This application claims the benefit of provisional application No. 60/281,284 filed on Apr. 3, 2001 and entitled "Scintillation Detector, System and Method Providing Energy & Position Information," which is hereby incorporated herein by reference in its entirety.

FIELD OF THE INVENTION

The invention described herein relates generally to scintillation detectors sensitive to ionizing radiation, to a method for performing radiation-based measurements, and also to methods of manufacture for such scintillation detectors. The scintillation detectors and methods are particularly useful for imaging in nuclear medicine applications, but may have use in other applications where the radiation energy passing into the scintillator or the position of interaction of the radiation with the scintillator are of interest.

BACKGROUND OF THE INVENTION

Scintillation detectors have been employed in medical imaging applications for some years and are embodied in devices called "gamma cameras" and also called "Anger" cameras after the developer, H. O. Anger. Typically, these cameras use scintillation crystals of sodium iodide doped with thallium as detectors for detecting gamma rays from radiopharmaceuticals used in nuclear medicine studies. The crystals are typically round or rectangular plates with their largest dimensions from 12 to 30" in diameter or diagonal. These sodium iodide crystal detectors have a typical thickness of ⅜" to ½" (0.9 cm to 1.3 cm), sufficient for highly efficient detection of gamma rays emitted from the isotope Tc-199m, which is included in many radiopharmaceuticals and emits gamma radiation with an energy of 140 keV. For other isotopes, other crystal thicknesses may be appropriate.

A typical gamma camera detector assembly 20 is diagrammatically illustrated in FIGS. 1a and 1b. Radiation quanta 21 incident on the assembly 20 via a collimator 22 interact with the crystal 24 to produce an amount of scintillation light uniquely and nearly linearly related to the amount of energy transferred to the crystal by the radiation. The amount of energy in the incident radiation quanta may be one parameter of interest to the user and, as a result, precise determination of the energy deposited in the crystal is of considerable interest. In particular, the user is interested in knowing whether the incident quanta has the full energy of the emitting isotope or whether it has somewhat less energy, since energy loss can result from scatter in the patient or the detector. Scattered radiation degrades the quality of the image. The energy information is represented by the amount of light produced by the scintillation crystal.

As is also shown in FIGS. 1a and 1b, the typical detector assembly 20 includes an optical system for collecting the light produced in the scintillation crystal 24 and a light conversion system for electronically sensing the light collected. There are two main components in the optical system. One is an optical window 26, typically glass, which may be bonded to one face of the crystal 24 with a transparent optical adhesive 27. The other is a reflector 28 which typically covers the remaining surfaces of the crystal. FIGS. 1a and 1b also show an array of light sensors 30, typically photomultiplier tubes (PMT's), which are used to sense the light signal and convert it into an electrical signal pulse uniquely and typically nearly linearly related to the light incident on the Light sensor. Usually an optical coupling material 32 such as an optical coupling grease or potting compound is used to optically couple the PMT's to the optical window.

The package for the crystal is a moisture-impermeable housing 34 covering all sides of the crystal 24 except the portion covered by the optical window 26. This housing 34 is typically made of aluminum and is typically bonded to the edges of the glass optical window 26 with moisture-resistant adhesive 35, such as an epoxy, to provide a hermitic seal in the case of hygroscopic crystals such as Thallium-doped sodium iodide. The housing serves to prevent entrance of moisture while allowing entrance of the gamma radiation of interest. Amplification and signal processing electronics 37 are used to analyze and display the electrical information.

The user's desire for accurate energy information may be best met with an optical system that directs or redirects all the original light toward and into the light sensors, so that all light produced is collected and converted faithfully into electrical signals. Loss of light without sensing reduces the energy information available. The higher the light production and light collection efficiency, the better the energy information quality, which is often expressed as the "energy resolution" or "spectrum peak full width at half maximum".

Reflection is important for maximizing light collection and energy information. As depicted in FIG. 1a, light from a radiation interaction (event) 40 that is originally directed away from the light sensors encounters the crystal surface and some is reflected by the index of refraction mismatch between the crystal and the surrounding air. This is represented by the light path "A" in the FIG. 1a. Some of the light may also pass through the crystal surface and encounter the reflector 28, as is represented by the light path "B" in the FIG. 1a. The reflector redirects this light so that it also has the possibility of being collected by the PMT's.

There are also other, less helpful reflections in the optical system. Light reaching the boundary between the crystal 24 (index of refraction about 1.8 for sodium iodide) and the optical coupling compound 27 (index of refraction typically 1.5 or less) is also reflected by the index of refraction mismatch between the crystal and optical coupling compound 27 as is depicted by the light path "C" in FIG. 1a. These reflections direct light away from the PMT's. Multiple reflections of the favorable and unfavorable types may occur before light is collected and sensed, or finally lost. In a typical system, the outputs of the PMT's are adjusted to be normalized, so that their sum is directly representative of the total light collection and the desired energy information.

The location of the radiation interaction usually is also of interest to the user. For this reason an array of light sensors 30 is used to sense the light, rather than a single position-insensitive light sensor. With proper design the light from a radiation interaction 40 in the crystal is distributed among several PMT's. Prior determination of the distribution functions for light among the several PMT's as a function of position allows later electronic and software determination of the location of a gamma ray interaction in the crystal. What is important for position determination is the spreading of the light, meaning its distribution in relation to the light sensor network. Roughly speaking, if light were to impinge on only a single position-insensitive Light sensor, no position information could be extracted. Also, if the light spreads among too many PMT's, the signal amplitude in each will below and therefore too easily influenced by electronic noise. A preferred situation is to distribute the light among a relatively small number of PMT's. As with energy determination, precise location of an event is aided if more light is collected, but as mentioned, the distribution is also needed for position determination. The multiple reflections mentioned earlier tend to spread the light collection area for determining event position beyond the preferred range only encompassing a few PMT's.

In Anger's method, position signals are derived from a network of weighting impedances related to a Light sensor hexagonal array and yield event positions as X and Y signals uniquely related to the X and Y Cartesian coordinate location of the radiation interaction. The sum of signals from all PMT's provides the desired energy signal. Combined with a radiation collimator and suitable electronics, such a system provides images of a patient's radio-pharmaceutical uptake for nuclear medical imaging.

The optical window 26 shown in FIG. 1a heretofore has served multiple functions. First, it transmits light from the scintillator 24 to the PMT's. Second, it may provide a hermetic barrier protecting a hygroscopic sodium iodide crystal from attack by moisture. Third, it may provide mechanical support for the crystal and light sensors. Fourth, it may provide a controlled spacing between the crystal and PMT's which allows a proper spread of light among the PMT's and provides an optimization of position and energy analysis compatible with other elements of the imaging system. The adjustment of light spreading can also be accomplished with an additional thickness of transparent light pipe or light guide material inserted between and optically coupled to the optical window and PMT's.

To use the position-sensitive method developed by Anger, the crystal and optical window are optically continuous slabs essentially free of light scattering defects, so that light propagates directly or by reflection in a predictable way with repeatable division among the PMT's. Significant defects in the crystal or the glass will cast shadows or interrupt or alter the transport of light and thereby alter the quality of, or introduce image artifacts into, the resulting images. Part of the art of successfully fabricating gamma camera radiation detectors lies in the production of high quality, large, essentially monocrystalline sodium iodide crystal plates and the fabrication of similar size pieces of high optical quality glass.

Collection of substantially all light requires highly efficient reflectors. As a matter of practice, crystal surfaces and reflectors are typically chosen for diffuse reflective characteristics, rather than specular ones. Specular reflectors tend to transport light to the edges of the crystal, while diffuse reflectors tend to provide a more favorable confined, compact light distribution which retains the light in the area of interest to permit position sensing with a relatively small number of PMT's.

Gamma camera technology has evolved since Anger's developments so that the determination of the position information may be done by techniques different from an X-Y impedance network, or ladder approach. Such alternative techniques include direct signal digitization and computer processing, nonlinear signal elements, and so forth. Essentially, though, these methods still rely on the collection of light from a large, optically homogeneous crystal in which light is distributed among a number of light sensors, so that the essential feature of the large gamma camera plate is to produce an amount of light proportional to the energy absorbed and to distribute the light reproducibly among an array of light sensors or upon a position-sensitive light sensor composed of light sensor elements. Design parameters such as the optical window thickness, the diffuse nature of the reflectors, or the degree of reflection, or all of these have an impact on tuning and optimizing the performance of the gamma camera crystal assembly in relation to the full camera sensing and computation system.

The description above of Anger's method and others has concentrated on planar imaging. There is a derivative technique wherein the camera detector, or several such detectors, are moved to several positions, images acquired, and the results processed to produce tomographic images of the radiation distribution in the patient. This is referred to as "Single Photon Emission Computed Tomography", or "SPECT" imaging. Both SPECT and planar imaging can be affected by absorption of the primary emission in the patient. Correction for this attenuation has led to methods for measurement and calculation of attenuation correction factors. Some of these methods involve the transmission of radiation through the patient from sources in known locations, a technique which sometimes results in high count rates at the detector.

Gamma camera detector pairs or arrays have also been applied to Positron Emission Tomography, "PET" imaging, a nuclear medicine technique based on coincidence detection and positioning of positron annihilation radiation without collimators. This method of imaging operates at high count rates because there are no collimators and uses 511 keV radiation, the detection of which is enhanced by use of crystals thicker than those typically found in conventional gamma cameras.

Typical existing gamma camera detector assemblies like those described above have the disadvantage that their effective use requires large, highly transparent crystals and associated glass window pieces with a high degree of optical perfection over large areas. They must have a high degree of freedom from bubbles, inclusions, or other defects which absorb light or alter its distribution.

These gamma camera detectors also have the disadvantage that all the PMT's are optically connected to the entire crystal, so that radiation events anywhere on the face of the crystal activate large areas of the sensing and electronics analysis system. This means that the analysis system must accommodate count rates produced by the entire crystal or large portions of it. Work with transmission attenuation correction and PET studies on gamma cameras have increased the need for high rate counting. This rate limitation can be overcome partially by choosing to involve fewer PMT's in each event processing step, such as is described in U.S. Pat. No. 5,576,547. While involving fewer PMT's improves rate capability, other properties may suffer. Too few PMT's leads to light transmission beyond the sensing area in use being lost for position or energy determination purposes, or both. However, an alternative technique allowing for high rates is available. It involves essentially dividing the crystal into individual pieces, or pixels, and sensing position by noting which pixel is struck. This technique has count rate advantages, but also has cost disadvantages in that many more PMT's are required to achieve the same spatial resolution as is available from a conventional gamma camera.

The present gamma cameras cannot provide position information toward their edges because beyond about the middle of the last edge PMT in the sensing array, position information from properly located additional tubes is not available. This leads to a useful field of view which is smaller than the size of the crystal and consequently effectively to an edge region which is "dead". To partially mitigate this effect, the optical window and edge PMT's may extend beyond the edge of the crystal by a signification fraction of the PMT radius. However, such a glass extension or overhang precludes bringing the edge of the detector crystal close to the patient, an effect which also increases the "dead" area of the gamma camera head.

The gamma camera crystal and glass are typically flat, but can be shaped by bending in one or more dimensions if necessary. While such shaping is possible, the glass and crystal do not lend themselves easily to forming shapes which conform to the body and not at all to shapes which can be changed after fabrication. Annular assemblies can also be produced, but they have the disadvantage that thermal expansion mismatches between the NaI crystal and glass window tend to stress and break the optical coupling between the window and crystal as a result of changes in temperature.

Another shortcoming of the conventional gamma camera is that the light sensitive area of the PMT light sensor, the cathode, does not typically cover the entire glass surface of the optical window. For example, if the PMT's are round, there are naturally spaces between PMT's which are not covered with cathode material. The use of closely packed arrays of square or hexagonal PMT's partly corrects this problem, but while the spaces between cathodes are reduced in area, they still exist at the glass walls of the PMT's where no cathode material is present. Square and hexagonal tubes also typically have the disadvantage of higher cost because of their more complex shape and may sometimes have poorer performance due to electron collection problems arising from that shape.

As has been seen, the need for position information requires that light be distributed among PMT's rather than being directed only to the nearest non-position sensing PMT. This distribution requirement and the detector construction details both cause light to propagate beyond the PMT's best able to determine an event's position and in some cases cause the light to escape or be absorbed, thereby being lost to the energy signal. In other words, the requirement for light distribution and position determination inherently causes light to be lost, which in turn deteriorates position determination and energy signals.

The arrangement of the camera crystal with a contiguous optical window introduces four optical boundaries into the optical system, one between the crystal and coupling compound, another between the compound to the window, a third between the optical window to another layer of coupling compound, and finally in the joining of the final coupling compound layer to the PMT. If there is any mismatch in the index of refraction of these layers, light is reflected and tends to be less useful for position determination or may be lost entirely.

From the above discussion, it can be concluded that there is a need for an improved detector which reduces or eliminates one or more of the undesirable effects present in existing designs.

SUMMARY OF THE INVENTION

In accordance with the present invention, a novel radiation detector, in particular a gamma camera, is constructed and operated in such a fashion that only a predetermined number of light sensors (such as PMT's) adjoining each other in a cluster are used to generate a signal with amplitude and event position information. The novel camera may also use an array of individual scintillation elements (crystals) in place of a single crystal, with certain advantages obtained thereby. The invention also provides other features that are applicable to the foregoing detector and also to other types of scintillation devices as well.

According to one aspect of the invention, a scintillation detector comprises a scintillator, a plurality of light sensors optically coupled to the scintillator for producing light sensor signals upon occurrence of a scintillation event in the scintillator that produces light sensed by the light sensors, and a processor for selecting a group of three mutually-adjoining light sensors having the highest amplitude light sensor signals amongst the plurality of light sensors for a particular radiation event, and for determining the relative position of the radiation event from the light sensor signals of the selected group of light sensors.

In a preferred embodiment, the plurality of light sensors are each equally spaced from mutually-adjoining light sensors, and the scintillator may comprise an array of triangular scintillator segments partially or completely optically isolated from one another. In one arrangement, each light sensor views three mutually contiguous scintillator segments, whereas in another arrangement each scintillator segment is viewed by a respective group of three mutually contiguous light sensors dedicated to the respective scintillator segment. Each segment may be formed by a respective discrete scintillation crystal, and a reflective bonding material may be interposed between contiguous sides of the scintillator segments to join the discrete segments to one another. The segments may also have tapered sides for positioning in a nonplanar arrangement, and the discrete scintillation crystals may be mounted on a flexible substrate. In another arrangement, a scintillation crystal may have formed in a surface thereof a plurality of slits separating adjacent portions of the crystal, with each portion forming a respective one of the scintillation segments.

According to another aspect of the invention, there is provided a method of obtaining event position information in a scintillation detector having a scintillator and a plurality of light sensors optically coupled to the scintillator for producing light sensor signals upon occurrence of a scintillation event in the scintillator that produces light sensed by the light sensors. The method comprises the steps of (a) selecting a group of three mutually-adjoining light sensors having the highest amplitude light sensor signals amongst the plurality of light sensors for a particular radiation event; and (b) determining the relative position of the radiation event from the light sensor signals of the selected group of light sensors.

The invention also provides a scintillator and detector assembly comprising a scintillator, and a plurality of light sensors optically coupled to the scintillator for producing light sensor signals upon occurrence of a scintillation event in the scintillator that produces light sensed by the light sensors, wherein the scintillator comprises an array of triangular scintillator segments partially or completely optically isolated from one another.

According to a further aspect of the invention, a scintillation device comprises a housing, a scintillation crystal contained within the housing, and an optical window closing an open end of the housing, wherein a reflector is sandwiched between the optical window and the scintillation crystal, and the reflector defines an array of apertures through which scintillation light can pass from the scintillation crystal to and through the optical window for sensing by a plurality of light sensors optically coupled to the optical window in an array corresponding to the array of apertures in the reflector. This arrangement may have general application to scintillation devices of various types. In a preferred embodiment, the plurality of light sensors may be optically coupled to the optical window in an array corresponding to the array of apertures in the reflector, and the reflector may include a white polyester film.

According to yet another aspect of the invention, a scintillation device comprises a housing, a scintillation crystal contained within the housing, an array of light sensors optically coupled to the scintillation crystal, each light sensor having a light sensitive region, and a reflective film located between the scintillation crystal and light sensors and surrounding the light sensitive regions of the light sensors.

According to still another and more general aspect of the invention, a scintillation device comprises a scintillator and a reflector disposed at a surface of the scintillator for reflecting scintillation light, wherein the reflector is made from a white polyester reflective material. Such a material has been found not to exhibit a significant loss of reflectivity when exposed to optical coupling and potting compounds which heretofore significantly degraded reflector performance.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

BRIEF DESCRIPTION OF THE DRAWINGS

FIG. 1a is a schematic sectional representation of a typical prior art gamma camera apparatus showing the relative positions of the PMT's, the gamma camera plate assembly, the radiation collimator, and the radiation source.

FIG. 1b is a schematic top plan view of a fragment of the structure of FIG. 1 showing a cluster of PMT's and the relative position of a scintillation event.

FIG. 2a is a schematic top plan view of the PMT's of a gamma camera apparatus in accordance with one embodiment of the invention which respond to the scintillation event.

DETAILED DESCRIPTION

Figure 2C:
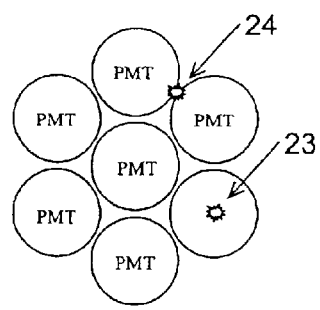
FIG. 2c is a schematic top plan view similar to FIG. 2a and showing radiation events at the center of a PMT and halfway between two PMTs.

Aside from the differences described below, a detector system and method (particularly a gamma camera and its method of operation) according to the several below described embodiments of the invention may be the same as the above-described prior art detector system shown in FIGS. 1a and 1b. Accordingly, like reference numerals are used below to denote the same or similar elements.

In accordance with one preferred embodiment of the novel invention, a gamma camera is constructed and operated so that signal amplitude and event position information is obtained from a cluster of three mutually-adjoining light sensors by the use of triangular coordinate mathematics. By this approach, the number of light sensor's involved in position and energy determination for a particular event is reduced from the number involved in prior arrangements as discussed above principally to only three light sensor's, as is shown schematically in FIGS. 2a, 3a, 3b, 3c, 3d, and 3e. The three light sensor's with the largest signals for a particular event are the ones selected for analysis for a given radiation interaction/event. This reduction in the number of light sensor's involved in event analysis increases the system count rate capability.

The foregoing approach also enables simultaneous processing of events at different locations in the scintillator. At each location only a triplet of three neighboring light sensors is involved, provided the events are sufficiently spaced that the triplets do not include a common light sensor. Consequently, the outputs of the two triplets may be processed simultaneously and independently, thereby providing higher count rate capability.

Triangular coordinate mathematics is particularly appropriate for the event analysis of gamma camera detectors. In the vast majority of cases an event occurring somewhere in the crystal will occur between three light sensor's, e.g. PMT's, assuming a commonly-used hexagonal layout. There are some exceptions to this, such as an event occurring exactly at center of a light sensor (e.g., PMT) as depicted at 23 in FIG. 2c or an event occurring precisely halfway between two light sensors ("double points") as depicted at 24 in FIG. 2c. Which three light sensors are best selected for analysis of the event is determined by electronically sorting the output amplitude of all light sensors in known ways and selecting the top three mutually contiguous light sensors as indicated by the equilateral triangle in FIG.

2a formed by the lines connecting the centers of the three selected light sensors. For events at light sensor centers, a single light sensor will have the maximum, and the six light sensors immediately surrounding it will have roughly equal outputs. Any two of those six equal output light sensors can be used for the event analysis, together with the light sensor having the maximum output. For events at double points, two light sensors will have the maximum signal and two additional adjoining light sensors will have equal, lower outputs. Either of the two adjoining equal, lower output light sensors may used for the event analysis, together with the double point light sensors.

By way of a specific example, the output amplitude of the light sensors can be sorted by summing the amplitudes of each group of three mutually contiguous light sensors. For the sake of clarification, it is noted that a single light sensor can belong to more than one group of three mutually contiguous light sensors. In the array 41 of light sensors, specifically the PMT's 30, shown in FIG. 2a, the light sensor at the center is a member of six groups of three mutually contiguous light sensors. A comparison of the sums of the amplitudes of each group will identify the group with the highest amplitude that will be selected for further analysis. In some instances, such as when the event is at a light sensor center, there may be two or more groups having the same maximum value, in which case any one of these groups may be selected for analysis or, if desired for improved performance, two or more of such groups having the same maximum value can analyzed.

Once the appropriate group of three mutually contiguous light sensors is selected for event analysis, the event location to each light sensor of the group is then defined. Also, for purposes of this description, a preferred light sensor is a PMT and the following description generally describes the invention in relation to the use of PMT's of circular cross-section. However, it will be appreciated that principles of the present invention may be applied to scintillation detectors and methods using other type of light sensors, such as solid state photosensors, as may be desired, and those skilled in the art will appreciate from the following description how to adapt the same to light sensors of different types and configurations, while still achieving one or more advantages afforded by the present invention.

Figure 2D:
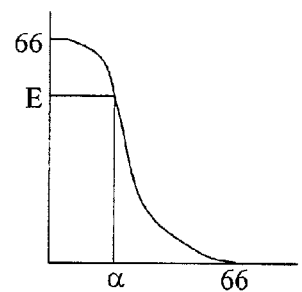
FIG. 2d is a graph showing a typical normalized light response of a typical light sensor.
Figure 2B:
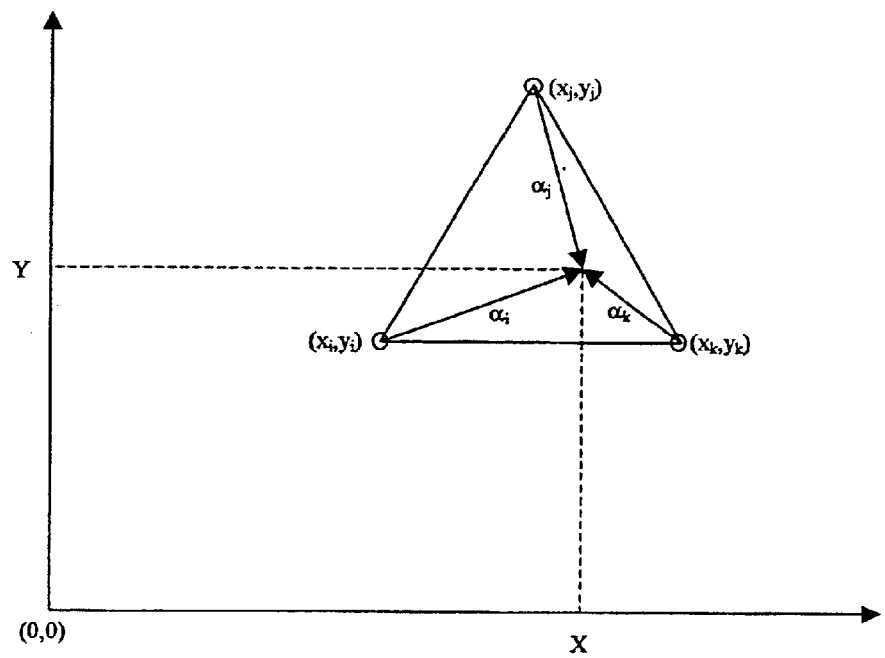
FIG. 2b is a graphical illustration of triangular math according to the present invention.

A frame of reference for the determination of the event location is established by viewing the triangle connecting the centers of the selected light sensors in the context of a Cartesian framework with x,y axes as shown in FIG. 2b, with each light sensor center 43i, 43j, 43k having a defined coordinate location $x_i,y_i$; $x_j,y_j$; $x_k,y_k$, respectively. The event location 40 is precisely defined in relation to the light sensor centers by the three respective radii $\alpha_i$, $\alpha_j$, $\alpha_k$. By conveniently aligning one side of the equilateral triangle along an axis x, $\alpha_i$, and $\alpha_k$ now each become the hypotenuse r of respective right triangles formed by a broken line from the event location to the x-axis and perpendicular to it. By inserting these designations in the quadratic equation relating the sides of a right triangle with the hypotenuse, $$r^2 = (x-h)^2 + (y-k)^2$$

the result of Equations 1, 2 and 3 below is obtained.

$$\alpha_i^2 = (x-x_i)^2 + (y-y_i)^2 \tag{1}$$

$$\alpha_j^2 = (x-x_j)^2 + (y-y_j)^2 \tag{2}$$

$$\alpha_k^2 = (x-x_k)^2 + (y-y_k)^2 \tag{3}$$

The right side of above equations may be expanded as follows (expanded standard form):

$$\alpha_i^2 = x^2 - 2x_i x + x_i^2 + y^2 - 2y_i y + y_i^2 \tag{4}$$

$$\alpha_j^2 = x^2 - 2x_j x + x_j^2 + y^2 - 2y_j y + y_j^2 \tag{5}$$

$$\alpha_k^2 = x^2 - 2x_k x + x_k^2 + y^2 - 2y_k y + y_k^2 \tag{6}$$

Next, the locations of the light sensors are defined. The R term is the radius relative to the origin. This results in the following Equations 7, 8 and 9. It is noted that since the light sensor locations are being defined relative to the origin, which is defined as 0,0, the second part of the x and y terms does not exist in these expressions. The following circle equations define the locations of the three light sensors relative to the origin using right angle triangles:

$$R_i^2 = x_i^2 + y_i^2 \tag{7}$$

$$R_j^2 = x_j^2 + y_j^2 \tag{8}$$

$$R_k^2 = x_k^2 + y_k^2 \tag{9}$$

Using the above substitutions (the equations are rearranged to group the $x_i^2$ and $y_i^2$, etc, terms that can then be replaced with the $R_i^2$, etc, terms), Equations 4, 5 and 6 can be rewritten as follows:

$$\alpha_i^2 = (x^2 + y^2) - 2(x_i x + y_i y) + R_i^2 \tag{10}$$

$$\alpha_j^2 = (x^2 + y^2) - 2(x_j x + y_j y) + R_j^2 \tag{11}$$

$$\alpha_k^2 = (x^2 + y^2) - 2(x_k x + y_k y) + R_k^2 \tag{12}$$

This allows for defining the event location as a function of the location of each light sensor and the location of the event relative to that light sensor.

Equations 10, 11 and 12 can be rearranged as follows to isolate the common term $(x^2+y^2)$:

$$(x^2+y^2) = (\alpha_i^2 - R_i^2) + 2(x_i x + y_i y) \tag{13}$$

$$(x^2+y^2) = (\alpha_j^2 - R_j^2) + 2(x_j x + y_j y) \tag{14}$$

$$(x^2+y^2) = (\alpha_k^2 - R_k^2) + 2(x_k x + y_k y) \tag{15}$$

Equations 13 & 14 and 14 & 15 can be equated in the following manner (since $(x^2+y^2)$ is common, the j equations can be substituted on the $(x^2+y^2)$ side of the i equations, etc; the equations can then be rearranged to move the x & y terms to one side and the $\alpha$ and R terms to the other; finally, x & y can then be separated from the $x_i$, & $y_i$, etc., terms):

$$(\alpha_i^2 - R_i^2) + 2(x_i x + y_i y) = (\alpha_j^2 - R_j^2) + 2(x_j x + y_j y) \tag{16}$$

$$2(x_i x + y_i y) - 2(x_j x + y_j y) = (\alpha_j^2 - R_j^2) - (\alpha_i^2 - R_i^2) \tag{17}$$

$$x(x_i - x_j) + y(y_i - y_j) = \frac{1}{2}[(\alpha_j^2 - R_j^2) - (\alpha_i^2 - R_i^2)] \tag{18}$$

$$(\alpha_j^2 - R_j^2) + 2(x_j x + y_j y) = (\alpha_k^2 - R_k^2) + 2(x_k x + y_k y) \tag{19}$$

$$2(x_j x + y_j y) - 2(x_k x + y_k y) = (\alpha_k^2 - R_k^2) - (\alpha_j^2 - R_j^2) \tag{20}$$

$$x(x_j - x_k) + y(y_j - y_k) = \frac{1}{2}[(\alpha_k^2 - R_k^2) - (\alpha_j^2 - R_j^2)] \tag{21}$$

Rewriting Equations 18 & 21 with rearrangement of terms on the right hand side of the equal sign yields (the $\alpha$ and R terms are then separated):

$$x(x_i - x_j) + y(y_i - y_j) = [(\alpha_j^2 - \alpha_i^2) - (R_j^2 - R_i^2)]/2 = C_{11} \quad (22)$$

$$x(x_j - x_k) + y(y_j - y_k) = [(\alpha_k^2 - \alpha_j^2) - (R_k^2 - R_j^2)]/2 = C_{21} \quad (23)$$

The above equations can be represented in matrix form as follows by identifying the coefficient terms, $A_{xx}$, and the fact that the $C_{xx}$ matrix can by represented as the sum of two matrices, $D_{xx}$ & $E_{xx}$, where $D_{xx}$ contains the observed unknown and $E_{xx}$ contains constants.

$$\begin{pmatrix} A_{11} & A_{12} \\ A_{21} & A_{22} \end{pmatrix} \begin{pmatrix} X \\ Y \end{pmatrix} = \begin{pmatrix} C_{11} \\ C_{21} \end{pmatrix} = \begin{pmatrix} D_{11} \\ D_{21} \end{pmatrix} - \begin{pmatrix} E_{11} \\ E_{21} \end{pmatrix} \quad (24)$$

where $$\begin{pmatrix} A_{11} & A_{12} \\ A_{21} & A_{22} \end{pmatrix} = \begin{pmatrix} (x_i - x_j) & (y_i - y_j) \\ (x_j - x_k) & (y_j - y_k) \end{pmatrix} \quad (25)$$

$$\begin{pmatrix} C_{11} \\ C_{21} \end{pmatrix} = \begin{pmatrix} \frac{1}{2}[(\alpha_j^2 - \alpha_i^2) - (R_j^2 - R_i^2)] \\ \frac{1}{2}[(\alpha_k^2 - \alpha_j^2) - (R_k^2 - R_j^2)] \end{pmatrix} \quad (26)$$

$$\begin{pmatrix} D_{11} \\ D_{21} \end{pmatrix} = \begin{pmatrix} (\alpha_j^2 - \alpha_i^2)/2 \\ (\alpha_k^2 - \alpha_j^2)/2 \end{pmatrix} \quad (27)$$

$$\begin{pmatrix} E_{11} \\ E_{21} \end{pmatrix} = \begin{pmatrix} (R_j^2 - R_i^2)/2 \\ (R_k^2 - R_j^2)/2 \end{pmatrix} \quad (28)$$

To solve for X and Y, the A matrix must be moved to the other side of the equation:

$$\begin{pmatrix} X \\ Y \end{pmatrix} = A^{-1} \begin{pmatrix} C_{11} \\ C_{21} \end{pmatrix} \quad (29)$$

defining the terms:

$\alpha_i$, $\alpha_j$ & $\alpha_k$ as the measured variables, and x & y as the desired event coordinates dependent upon $\alpha_i$, $\alpha_j$ & $\alpha_k$ All other subscripted variables ($x_i$, etc., $y_i$, etc., $R_i$, etc.) are geometric constants dependent upon light sensor locations.

The inverse of the A matrix ($A^{-1}$) is defined as follows:

$$A^{-1} = \begin{pmatrix} \dfrac{(y_j - y_k)}{|A|} & -\dfrac{(y_i - y_j)}{|A|} \\ -\dfrac{(x_j - x_k)}{|A|} & \dfrac{(x_i - x_j)}{|A|} \end{pmatrix} \quad (30)$$

$$|A| = (x_i - x_j)(y_j - y_k) - (x_j - x_k)(y_i - y_j) \quad (31)$$

$|A|$ is the determinant associated with matrix A.

$$X = \frac{[(\alpha_j^2 - \alpha_i^2) - (R_j^2 - R_i^2)](y_j - y_k) - [(\alpha_k^2 - \alpha_j^2) - (R_k^2 - R_j^2)](y_i - y_j)}{2[(x_i - x_j)(y_j - y_k) - (x_j - x_k)(y_i - y_j)]} \quad (32)$$

$$Y = \frac{[(\alpha_k^2 - \alpha_j^2) - (R_k^2 - R_j^2)](x_i - x_j) - [(\alpha_j^2 - \alpha_i^2) - (R_j^2 - R_i^2)](x_j - x_k)}{2[(x_i - x_j)(y_j - y_k) - (x_j - x_k)(y_i - y_j)]} \quad (33)$$

The inverse can be verified by the following equation:

$$A \times A^{-1} = \begin{pmatrix} 1 & 0 \\ 0 & 1 \end{pmatrix} \quad (34)$$

Plugging in Equations 25 and 30, $$A \times A^{-1} = \begin{pmatrix} (x_i - x_j) & (y_i - y_j) \\ (x_j - x_k) & (y_j - y_k) \end{pmatrix} \begin{pmatrix} \dfrac{(y_j - y_k)}{|A|} & -\dfrac{(y_i - y_j)}{|A|} \\ \dfrac{-(x_j - x_k)}{|A|} & \dfrac{(x_i - x_j)}{|A|} \end{pmatrix} \quad (35)$$

Moving the determinant outside of the matrix, $$A \times A^{-1} = \frac{1}{|A|} \begin{pmatrix} (x_i - x_j) & (y_i - y_j) \\ (x_j - x_k) & (y_j - y_k) \end{pmatrix} \begin{pmatrix} (y_j - y_k) & -(y_i - y_j) \\ -(x_j - x_k) & (x_i - x_j) \end{pmatrix} \quad (36)$$

Multiplying the two matrices, $$A \times A^{-1} = \frac{1}{|A|} \begin{pmatrix} (x_i - x_j)(y_j - y_k) - (x_j - x_k)(y_i - y_j) & -(x_i - x_j)(y_i - y_j) + (x_i - x_j)(y_i - y_j) \\ (x_j - x_k)(y_j - y_k) - (x_j - x_k)(y_j - y_k) & -(x_j - x_k)(y_i - y_j) + (x_i - x_j)(y_j - y_k) \end{pmatrix} \quad (37)$$

The upper right-hand and lower lefthand terms cancel out, $$A \times A^{-1} = \frac{1}{|A|} \begin{pmatrix} (x_i - x_j)(y_j - y_k) - (x_j - x_k)(y_i - y_j) & 0 \\ 0 & -(x_j - x_k)(y_i - y_j) + (x_i - x_j)(y_j - y_k) \end{pmatrix} \quad (38)$$

Rearranging the lower right-hand term, $$A \times A^{-1} = \frac{1}{|A|} \begin{pmatrix} (x_i - x_j)(y_j - y_k) - (x_j - x_k)(y_i - y_j) & 0 \\ 0 & (x_i - x_j)(y_j - y_k) - (x_j - x_k)(y_i - y_j) \end{pmatrix} \quad (39)$$

Recalling Equation 31

$$|A| = (x_i - x_j)(y_j - y_k) - (x_j - x_k)(y_i - y_j) \quad (31)$$

and dividing all terms in the matrix by $|A|$ $$A \times A^{-1} = \begin{pmatrix} 1 & 0 \\ 0 & 1 \end{pmatrix} \quad (40)$$

This verifies that the matrix has been correctly inverted.

The $\alpha$ terms are determined by the magnitude of the signal seen by each light sensor. For a given light sensor, the light response can be defined. This is the magnitude of the energy relative to the distance from the light sensor. This magnitude can then be normalized to be equal to the light sensor distance measured. For example, with a 60 mm light sensor pattern spaced at 66 mm centers, the light response shown in FIG. 2d may be obtained. Therefore, at the light sensor center the normalized magnitude (E) is 66, while the distance from the light sensor origin ($\alpha$) is 0. At the center of an adjacent light sensor (66 mm away), the normalized E is 0 while $\alpha$=66. This should be relatively consistent in any direction, unless there are effects from the edge of the crystal, such as increased reflection, which may be compensated for by the analysis software as will be appreciated by those skilled in the art. The signal level versus position function may be determined by scanning the crystal with a collimated source.

Therefore, the distance from the centers of the three light sensors can be determined by the magnitudes of their signals. Three circles, each centered at the appropriate light sensor and at the appropriate $\alpha$ radius can be drawn. The event location is the intersection of those three circles. If the three circles do not intersect at one point (due to noise, light sensor nonuniformity, etc.), the result is a triangle (with curved sides), rather than a point, in which the event occurred. The larger the triangle, the more uncertainty there is in the event location. Any point within the triangle may be selected, such as the midpoint of the triangle. Once the location of the event is known relative to the light sensor centers, the location can be related to the coordinate system of the detector since the positions of the centers of the light sensors are known relative to such coordinate system.

The determination of energy, position, or both using three light sensors can be accomplished in ways other than triangular mathematics, including quite general digital techniques which record the response of three light sensors in advance as a function of event position. For events occurring near the line between the centers of two other light sensors, information from a fourth light sensor may be included to improve position determination, or the energy and/or position may be determined from the analysis of the signals from two or more groups of three mutually contiguous light sensors that have the same maximum amplitude as above discussed.

Figure 3A:
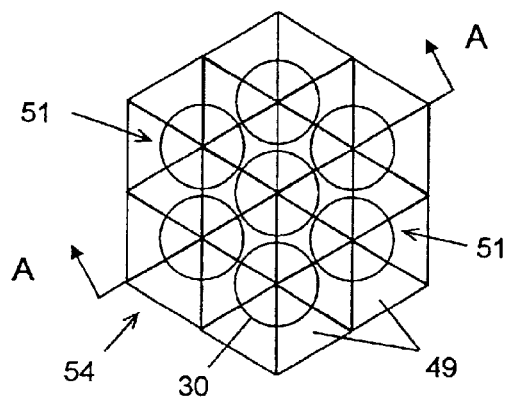
FIG. 3a is a schematic top plan view of the apparatus of FIG. 2a, together with a crystal which is an array of triangular crystal elements fitted together in registry with an array of PMT's so that each crystal element is associated with three PMT's.
Figure 3B:
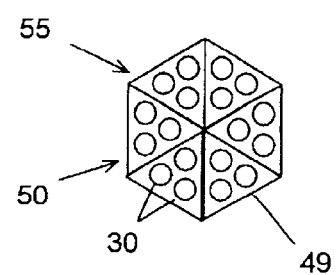
FIG. 3b is a schematic top plan view of the apparatus of FIG. 2a, together with a crystal which is an array of larger triangular crystal elements than those of FIG. 3a fitted together in registry with an array of PMT's so that each crystal element is associated with three PMT's which are not associated with any other crystal elements.

While the benefits of the present invention may be obtained using an optically continuous scintillator and window, such as an optically continuous slab of crystal and/or window glass that is essentially free of light scattering defects, additional advantage may be gained in accordance with the present invention by dividing the scintillator (crystal) and/or optical window into triangular segments 49 (crystal pieces) partially or completely optically isolated from one another and each viewed by three light sensors, as depicted in FIGS. 3a and 3b, without any loss of event location information and therefore without loss of resolution. For cost reasons, the light sensors may have the arrangement 51 where each light sensor views more than one crystal element 49 of a crystal array 54 as shown in FIG. 3a, but three light sensors may also have the arrangement 55 shown where three light sensors 30 are dedicated to each crystal segment 49 as shown in FIG. 3b. The arrangement of FIG. 3b promotes a live crystal edge.

The light sensors may be coupled to the crystal directly without a window or indirectly via a global window or via individual light pipes. Because the crystal segments are optically separated, at least in part, the fraction of light collected by the three mutually contiguous light sensors associated with a particular radiation event may be improved compared to no optical isolation among segments. The isolation directs some or all of the light from the radiation event to the three light sensors of interest. Division of the crystal into segments may improve rate capability in addition to light collection, and for complete cuts through the crystal foregoes the need for large, homogeneous crystals. Variations in response among the three light sensors allows for determination of the event position all the way to the edge of the triangular piece. Light collection and light distribution properties of the crystal and its optical system may be optimized to maximize the precision with which event location is determined.

Combinations of the two light sensor arrangements 51 and 55 shown in FIGS. 3a and 3b may be used, depending on the application. For example, there could be one light sensor viewing several crystals in the center of an array, individual light sensors viewing only a single crystal near the edges, or an arrangement 56 using smaller area light sensors 57 (smaller diameter PMT's) as shown in FIG. 3c that would promote a live edge.

Figure 3C:
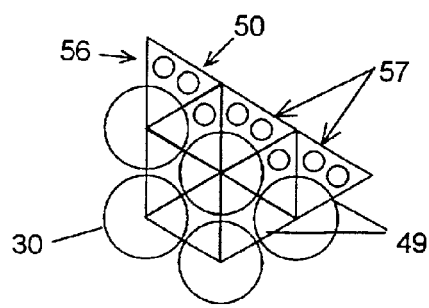
FIG. 3c is a schematic top plan view of an edge fragment of the apparatus of FIG. 3a, provided with two smaller PMT's associated with each crystal element in order to compensate for edge effects in the signal.
Figure 3D:
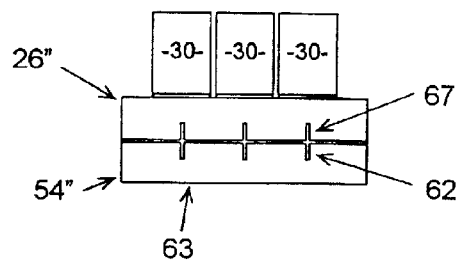
FIG. 3d is a schematic sectional view of the apparatus of FIG. 3a along the line A—A in accordance with a further embodiment of the invention in which the crystal is a larger piece which is grooved to form triangular elements which are partially optically isolated from each other.
Figure 3E:
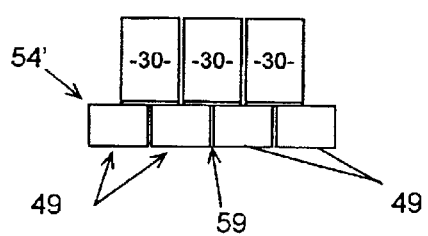
FIG. 3e is a schematic sectional view of the apparatus of FIG. 3a along the line A—A in accordance in which the triangular crystal elements are separate pieces entirely optically isolated from each other.

As shown in FIG. 3e, the segmented arrays 54 shown in FIGS. 3a, 3b and 3c may be manufactured by piecing together individual pieces 49' of crystal, possibly selected for performance criteria, to provide the segmented array 54'. The pieces of crystal may be bonded together at adjacent edges by a suitable adhesive 59 that preferably also functions as a reflector.

As shown in FIG. 3d, an array 54" may be fabricated by creating optically isolating slots 62 in a preexisting large crystal 63 and subsequently filling the slots with appropriate optical isolation or reflective material, or both, designed to tune the response to desirable characteristics. Similarly, the optical window 26" may have slots 67 formed therein in a pattern corresponding to the slots 62 in the crystal 63, and the slots 67 may be filled with an optical isolation or reflective material. As will also be appreciated, a slotted window like that shown in FIG. 3d may also be employed with the composite crystal element array 54' shown in FIG. 3e, where the slots in the window correspond to the interfaces between adjacent crystal elements in the array.

The use of a segmented scintillator may provide one or more advantages. All or almost all of the light associated with a particular event may be collected (in the case of triangular segmentation) by only three light sensors rather than by a greater number of light sensors. This improves the statistics at each light sensor, resulting in more accurate results (less uncertainty). The field of view may also be extended to the center of the outside row of light sensors, since there does not need to be another row of light sensors for position detection in the peripheral region of the scintillator. Edge effects (and the resulting change in light response) are minimized, since all light sensors, not just the outside light sensors, see edge effects. Therefore, the light response should be more consistent light sensor-to-light sensor.

As noted above, a segmented scintillator is not required for triangular mathematics analysis. However, the use of a segmented scintillator provides advantage over the use of a single optically continuous scintillator. Triangular mathematics analysis, or something other that the presently-used standard method, may (if not must) be used with segmented crystals. With digital positioning techniques, the individual segments of the optically isolated variant may or may not have their light output gain matched (normalized). In a preferred embodiment, the response of each segment may be stored and used for deriving appropriate gain compensation information.

The collimator 22 (FIG. 1a) associated with the scintillation crystal may itself be made with a triangular configuration and aligned so that collimator septa are directly opposite the slots or septa between individual crystal segments, which are a radiation dead region having no event occurrences.

The side edges of the crystal segments may be tapered so that they assemble into curved rather than flat shapes including, but not limited to, annular or domed arrays. Elements with tapered edges might be moved relative to one another in a final product to change the shape of the gamma camera detector for different clinical applications. For example, individual triangular crystal segments with tapered edges may be mounted on a flexible substrate that can be flexed to provide a desired shape of the detector.

A conventional gamma camera may be improved by removing the optical window, whether or not the scintillator is segmented. Elimination of the optical window may reduce the number of reflections encountered in the conventional camera and thereby improve light collection and localization of the light distribution. Elimination of the window also may allow for increasing the thickness of the crystal for achieving the desired light spread among light sensors, rather than using glass. Increasing the thickness may be advantageous for high energy radiation detection such as that encountered in PET applications. When the window is removed, two of its typical functions may be met by other methods. Hermetic seals must be provided among or beyond the light sensors. A crystal support superstructure must also be provided, either among or beyond the light sensors or from the radiation side of the crystal.

Figure 4:
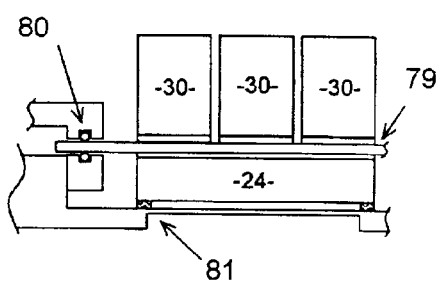
FIG. 4 is a schematic side, sectional view of a gamma camera plate assembly in accordance with a preferred embodiment of the present invention having a thin window between the crystal and the PMT's for improving resolution.

Some of the improvements realized by eliminating the optical window may also be brought about by using a very thin window. The advantage of a thin window 79 is that it is available for hermetic sealing, while leaving the advantage of a thick crystal available for light spreading and PET applications. A special low stress hermetic seal 80 may be used with a thin window, as is shown in FIG. 4. A support superstructure 81 independent of the window may still needed among or beyond the light sensors or provided by the light sensors. Otherwise, the assembly may need to be supported from the crystal side, as is illustrated in FIG. 4.

Figure 5A:
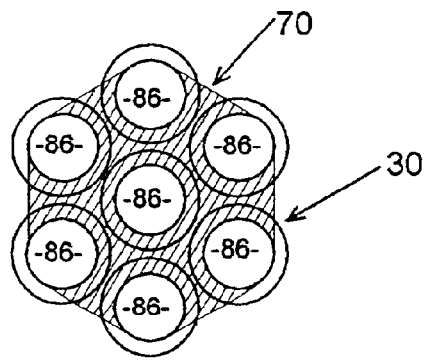
FIG. 5a is a schematic top plan view of a gamma camera plate assembly in accordance with a preferred embodiment of the invention including a reflector element for gathering light which otherwise would pass or be absorbed outside the photosensitive areas of the PMT's.
Figure 5B:
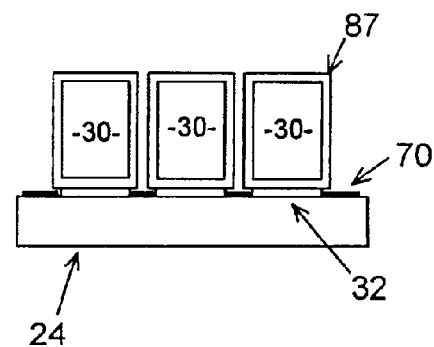
FIG. 5b is a schematic side, sectional view of the assembly of FIG. 5a with the reflector element adjacent the perimeters of the PMT face plates immediately surrounding the photocathode sensitive areas.
Figure 5C:
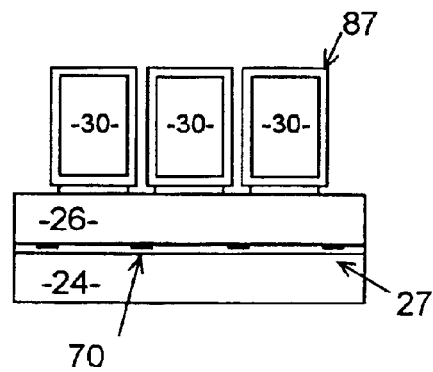
FIG. 5c is a schematic side sectional view of the assembly of FIG. 5a with the reflector element between the crystal and the window.

According to another aspect of the invention providing for improved light collection, a conventional gamma camera detector or any of the above described scintillator detector arrangements may be improved by the addition of a reflector 70 aligned with the spaces between the PMT's 30 or other light sensors, as illustrated in FIGS. 5a, 5b, and 5c. The light sensitive area of a PMT 30, called the cathode, only extends to the inner glass side wall 87 of the PMT. Moreover, cylindrical PMT's packed together have spaces between them even when packed together as closely as possible. Light reaching these areas away from the PMT cathodes (light sensitive area of the light sensors) generates no signals and is lost. Adding a reflector 70 in these areas as illustrated in FIGS. 5a, 5b and 5c improves light collection. Improvement also occurs for arrays of hexagonal or square light sensors, such as PMT's since their glass walls do not contain cathode material.

The reflector 70 may be on the PMT side of the optical window 26 as seen in FIG. 5b, on the crystal side of the window, i.e., sandwiched between the scintillator and the window as seen in FIG. 5c. Less interference with optical coupling media is possible on the PMT side, but greater proximity to the light source and greater control of the light distribution occurs on the crystal side. In FIG. 5c, the reflector preferably is in direct contact with one or both of the scintillator and window.

A preferred reflector 70 is a non-specular (lambertian) reflective sheet and particularly a reflective sheet that can be applied without wetting of the surface to which it is applied. This is in contrast to a paint which has the disadvantage that it wets the surface to which it is applied, thereby negating the advantage of total internal reflection.

A preferred reflector 70 is made of a material whose reflectivity will not be degraded by a significant amount by wetting with materials used to provide an optical coupling between the light sensors and the optical window or between the optical window and the scintillator, such as optical greases, adhesives and potting compounds. Conventional reflective materials, such as porous teflon, lose their reflectivity in these situations. A preferred reflector is one whose reflectivity does not degrade by more than about 20% when wetted by the optical coupling material used at the interface where the reflector is installed (or when exposed to a potting material in general), and preferably one that does not degrade by more than about 10%. A particularly preferred reflector is a white polyester film, such as Lumirror™ polyester film sold by Toray Industries, Inc. previously sold for use as a reflector plate for LCD back-lighting applications. Lumirror™ E60L polyester film is a white film with low specific gravity and high reflectivity, the typical properties of which are as follows:

| Properties | | Unit | | Measurement method |
|---|---|---|---|---|
| Thickness | MMV | µm | 188 | |
| Tensile strength | MD | MPa | 107 | ASTM D882 |
| | TD | MPa | 107 | ASTM D882 |
| Elongation at Break | MD | % | 85 | ASTM D882 |
| | TD | % | 70 | ASTM D882 |
| Thermal Shrinkage at (150C30min) | MD | % | 1.4 | ASTM D1204 |
| | TD | % | 0.8 | ASTM D1204 |

-continued

| Properties | Unit | | Measurement method |
|---|---|---|---|
| Whiteness Index | % | 130 | ASTM E313 |
| Specular Gloss | % | 25 | ASTM D2457 |
| Optical Density | — | 1.3 | JIS K7605 |

Other polyester films doped with a white reflective filler material (such as CaCO$_3$) are also contemplated.

Moreover, the white polyester reflective film has applications in scintillation devices other than those specifically disclosed herein, such as radiation detectors in general which include a scintillator and a reflector disposed at a surface (typically in contiguous contact) of the scintillator for reflecting light. The scintillator may be a scintillation crystal, plastic scintillator, etc., depending on the particular application. The reflector may be a white polyester reflective film, pad, plate, etc., depending on the particular application. Such a reflector may be exposed to a coupling or potting compound such as an oil, a silicone rubber, etc., without any significant degradation of the reflector's reflectivity, i.e., no greater than about 20% degradation. The aforesaid preferred Lumirror™ polyester film when wetted by an optical coupling or potting compound affords a reduction of reflectivity no greater than about 10%, or no greater than about 5%, or less.

The reflective sheet is provided with an array of openings for passing light to the light sensors. In the case where the reflective sheet is provided on the light sensor side of the optical window (or scintillator if no window is employed), the opening (apertures) preferably correspond in size and position to the active areas of the light sensors and specifically the photocathodes of PMT's. In the case where the reflective sheet is sandwiched between the optical window and scintillator, preferably the apertures preferably have an area no greater than and preferably less than the area of the light sensitive region of the respective light sensor.

In regard to the above-described triangular mathematics analysis and/or segmented scintillators, the light sensors may not have a uniform response across the light sensitive area thereof, such as across the photocathode of a PMT. Therefore, the light response function may vary not only from light sensor to light sensor, but also over the light sensitive area of a single light sensor. This may be compensated for by mapping the light sensitive area of the light sensors (e.g., the tube photocathodes) and incorporating this information into the event analysis in order to account for such variations. Also, the effects of events that are at light sensor centers or along the seams between scintillator segments may be compensated for during the event analysis, as will be appreciated by those of ordinary skill in the art.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A scintillation device comprising a scintillator, a reflector disposed at a surface of the scintillator for reflecting scintillation light, and an optical window through which scintillation light can pass from the scintillator to the optical window for sensing by a plurality of light sensors optically coupled to the optical window, the reflector having portions thereof sandwiched between the optical window and the scintillator and being made from a white polyester reflective material, wherein the scintillator is optically coupled to the optical window by an optical coupling compound to which the reflective material is exposed, and the reflectivity of the reflective material when exposed to the optical coupling compound is reduced by less than 20%.

2. A scintillation detector comprising a scintillation device as set forth in claim 1, a plurality of light sensors optically coupled to the optical window of the scintillation device for producing light sensor signals upon occurrence of a scintillation event in the scintillator that produces light sensed by the light sensors, and a processor for selecting a group of three mutually-adjoining light sensors having the highest amplitude light sensor signals amongst the plurality of light sensors for a particular radiation event, and for determining the relative position of the radiation event from the light sensor signals of the selected group of light sensors, wherein the plurality of light sensors are each equally spaced from mutually-adjoining light sensors, and wherein the scintillator comprises an array of triangular scintillator segments partially or completely optically isolated from one another.

3. A scintillation detector as set forth in claim 2, wherein each light sensor views more than one scintillator segment.

4. A scintillation detector as set forth in claim 2, wherein each light sensor views three mutually contiguous scintillator segments.

5. A scintillation detector as set forth in claim 2, wherein each scintillator segment is viewed by a respective group of three mutually contiguous light sensors dedicated to the respective scintillator segment.

6. A scintillation detector as set forth in claim 2, wherein each segment is formed by a respective discrete scintillation crystal.

7. A scintillation detector as set forth in claim 6, wherein a reflective bonding material is interposed between contiguous sides of the scintillator segments to join the discrete segments to one another.

8. A scintillation detector as set forth in claim 6, wherein each segment has tapered sides for positioning in a nonplanar arrangement.

9. A scintillation detector as set forth in claim 8, wherein the discrete scintillation crystals are mounted on a flexible substrate.

10. A scintillation detector as set forth in claim 2, wherein a scintillation crystal has formed in a surface thereof a plurality of slits separating adjacent portions of the crystal, each portion forming a respective one of the scintillation segments.

11. A scintillation detector as set forth in claim 2, wherein a reflector is interposed between contiguous sides of the scintillator segments.

12. A scintillator and detector assembly, comprising a scintillation device as set forth in claim 1, and a plurality of light sensors optically coupled to the optical window of the scintillation device for producing light sensor signals upon occurrence of a scintillation event in the scintillator that produces light sensed by the light sensors, wherein the scintillator comprises an array of triangular scintillator segments partially or completely optically isolated from one another, and each light sensor views more than one scintillator segment.

13. A scintillator and detector assembly as set forth in claim 12, wherein each light sensor views three mutually contiguous scintillator segments.

14. A scintillator and sensor assembly as set forth in claim 12, wherein each scintillator segment is viewed by a respective group of three mutually contiguous light sensors dedicated to the respective scintillator segment.

15. A scintillation device as set forth in claim 1, wherein the optical coupling compound is a potting compound.

16. A scintillation device as set forth in claim 1, wherein the optical coupling compound is an oil.

17. A scintillation device as set forth in claim 1, wherein the optical coupling compound is a silicone rubber.

18. A scintillation device as set forth in claim 1, wherein the reflective material is wetted by the optical coupling compound.

19. A scintillation device as set forth in claim 1, wherein the reflective material is a white polyester reflective film.

20. A scintillation detector comprising a scintillator, a plurality of light sensors optically coupled to the scintillator for producing light sensor signals upon occurrence of a scintillation event in the scintillator that produces light sensed by the light sensors, and a processor for selecting a group of three mutually-adjoining light sensors having the highest amplitude light sensor signals amongst the plurality of light sensors for a particular radiation event, and for determining the relative position of the radiation event from the light sensor signals of the selected group of light sensors, wherein the plurality of light sensors are each equally spaced from mutually-adjoining light sensors, and wherein the scintillator comprises an array of triangular scintillator segments partially or completely optically isolated from one another, wherein the scintillator includes a scintillation crystal contained within a housing, and an optical window closes an open end of the housing, and wherein a reflector is sandwiched between the optical window and the scintillation crystal, and the reflector defines an array of apertures through which scintillation light can pass from the scintillation crystal to and through the optical window for sensing by the plurality of light sensors optically coupled to the optical window in an array corresponding to the array of apertures in the reflector.

21. A scintillation detector as set forth in claim 20, wherein each light sensor has a light sensitive region and the respective aperture defined by the reflector has an area no greater than the area of the light sensitive region of the respective light sensor.

22. A scintillation detector as set forth in claim 20, wherein each light sensor has a light sensitive region and the respective aperture defined by the reflector has an area less than the area of the light sensitive region of the respective light sensor.

23. A scintillation detector as set forth in claim 20, wherein the scintillation crystal is optically coupled to the optical window by an optical coupling compound that wets the surface of the scintillation crystal or optical window.

24. A scintillation detector as set forth in claim 23, wherein the optical coupling compound is a transparent optical adhesive.

25. A scintillation detector as set forth in claim 24, wherein the optical window is made of glass.

26. A scintillation detector as set forth in claim 24, wherein the reflector includes a white polyester film.

27. A scintillation detector as set forth in claim 20, wherein the reflector includes a white polyester film.

28. A scintillation device comprising a housing, a scintillation crystal contained within the housing, and an optical window closing an open end of the housing, wherein a reflector is sandwiched between the optical window and the scintillation crystal, and the reflector defines an array of apertures through which scintillation light can pass from the scintillation crystal to and through the optical window for sensing by a plurality of light sensors optically coupled to the optical window in an array corresponding to the array of apertures in the reflector.

29. A scintillation device as set forth in claim 28, further comprising the plurality of light sensors optically coupled to the optical window in an array corresponding to the array of apertures in the reflector.

30. A scintillation device as set forth in claim 29, wherein each light sensor has a light sensitive region and the respective aperture defined by the reflector has an area no greater than the area of the light sensitive region of the respective light sensor.

31. A scintillation device as set forth in claim 29, wherein each light sensor has a light sensitive region and the respective aperture defined by the reflector has an area less than the area of the light sensitive region of the respective light sensor.

32. A scintillation device as set forth in claim 28, wherein the scintillation crystal is optically coupled to the optical window by an optical coupling compound that wets the surface of the scintillation crystal or optical window.

33. A scintillation device as set forth in claim 32, wherein the optical coupling compound is a transparent optical adhesive.

34. A scintillation device as set forth in claim 33, wherein the optical window is made of glass.

35. A scintillation device as set forth in claim 28, wherein the reflector includes a white polyester film.

36. A scintillation device comprising a housing, a scintillation crystal contained within the housing, an array of light sensors optically coupled to the scintillation crystal, each light sensor having a light sensitive region, and a reflective film is sandwiched between the scintillation crystal and the light sensors and surrounds the light sensitive regions of the light sensors, wherein the reflective film defines an array of apertures through which scintillation light can pass from the scintillation crystal to the light sensitive region of the light sensors while reflecting light at the regions disposed between the light sensitive regions of the light sensors.

37. A scintillation device as set forth in claim 36, wherein the reflector includes a white polyester film.

* * * * *